C. S. COLE.
METER INDICATOR.
APPLICATION FILED JULY 29, 1921.
1,436,381.
Patented Nov. 21, 1922.
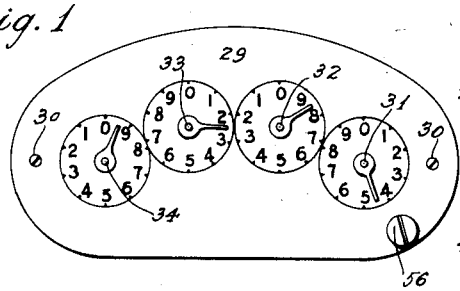
Fig. 1
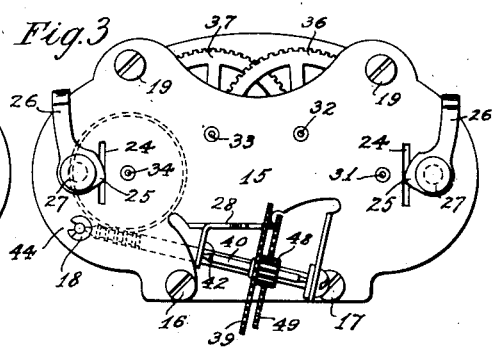
Fig. 3
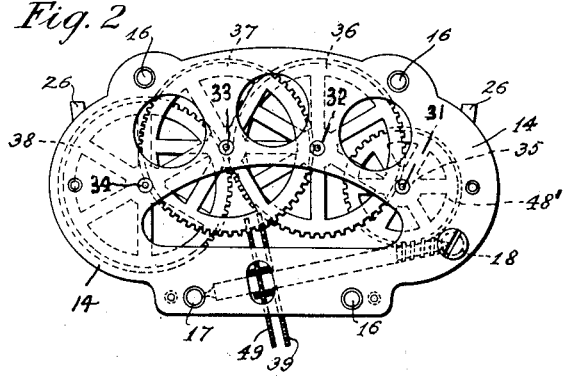
Fig. 2
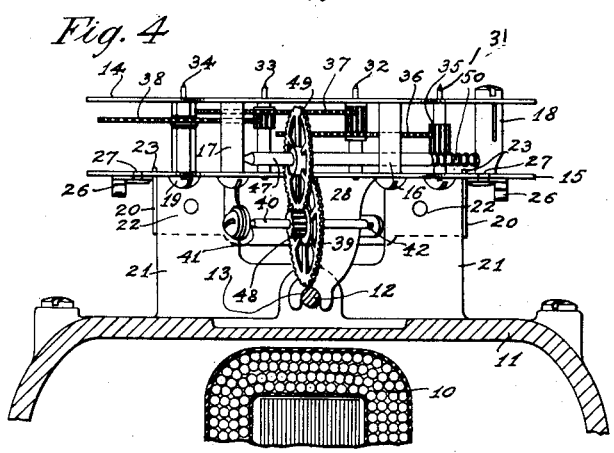
Fig. 4
Fig. 6
Fig. 7
Fig. 5
INVENTOR.
Charles S. Cole
BY
Chamberlain & Newman ATTORNEYS.

Patented Nov. 21, 1922.

1,436,381

UNITED STATES PATENT OFFICE.

CHARLES S. COLE, OF NEWTOWN, CONNECTICUT.

METER INDICATOR.

Application filed July 29, 1921. Serial No. 488,343.

*To all whom it may concern:*

Be it known that CHARLES S. COLE, a citizen of the United States, and resident of Newtown, in the county of Fairfield and State of Connecticut, has invented certain new and useful Improvements in Meter Indicators, of which the following is a specification.

This invention relates to new and useful improvements in registers or indicators for integrating watt hour meters such for instance as are commonly employed for registering the consumption of electricity.

The invention is designed as an improvement upon a commercial form of register, by simplifying its construction and lessening the cost of manufacturing the same. A further feature of the invention is to provide means of determining the ratio, without the introduction of a third member, between the meter shaft and the first pointer shaft. I also provide a construction having less frictional drag than the commercial form of registers before referred to and now upon the market.

Another and important object is to provide a construction of the above class and for the purpose stated, wherein the first pointer shaft is directly engaged and operated by a driven worm. And to provide means in said worm drive for the first pointer shaft whereby the same may be readily disconnected for the purpose of resetting the train indicating pointers upon the dial.

A further object is the placing of the first engaging shaft so as to engage with the worm on the meter shaft whereby the inclination of the helix of the worm coincides with the operating face of the teeth on the gear of the first engaging shaft.

A further advantage is obtained in the arrangement of the gear, upon the first engaging ratio shaft, with the meter worm, so that due to the angular positioning of the shaft, the predominating thrust comes more directly upon the lower pivot thereby insuring more constancy in the freedom of operation. This thrust obviously comes upon the lower pivot by virtue of gravity irrespective of any slight deviation from a vertical mounting of the meter.

Where it is not necessary to provide a change of ratio between the driving and driven parts the ratio shaft and its gears may be eliminated and the large gear of the register directly engaged with the worm of meter shaft through large gear.

With these and other objects in view the invention resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawings forming a part of this specification, and upon which, Fig. 1 shows a front elevational view of a meter dial plate such as is employed upon commercial forms of watt hour meters, to which my invention may be applied;

Fig. 2 is a front elevational view of the indicator gear train with dial plate removed;

Fig. 3 is a rear view of the same;

Fig. 4 is a bottom plan view of the indicator gear train, having dial plate removed, operatively connected with the frame of an electric meter;

Fig. 5 is an enlarged detail sectional elevation showing the first engaging or ratio shaft, its gears and pintle ends;

Fig. 6 is an enlarged sectional elevation of one of the supporting posts and the engaging pintle end of worm shaft for driving the first pointer shaft; and Fig. 7 is a similar supporting post and opposite engaging pintle end of the same shaft shown in Fig. 6.

Referring in detail to the characters of reference marked upon the drawings, 10 represents a part of a coil of a commercial form of electric meter and 11 a portion of the casing for enclosing the same. 12 indicates a driving shaft mounted upon the meter frame and operated by the meter when the current is flowing therethrough. This form of a driven shaft is more or less common in several commercial types of meters and as a rule is mounted to operate in a vertical plane when the meter is properly mounted in an upright position. The shaft is cut to form a worm 13 whereby movement is transmitted therefrom to the indicating mechanism to register the amount of current flowing through the meter. This much of the device as described is more or less of standard construction, though it varies slightly in detail so far as different makes of meters are concerned.

The indicator is in a measure constructed along the lines of a clock movement, and includes a supporting frame comprising a front plate 14 and a back plate 15, the two being secured together by five posts 16, 17 and 18. Posts 16 are of simple construction having their front ends riveted to the frame plate 14 and their opposite ends secured to the rear frame plate 15 by means of screws 19. These posts are all preferably positioned adjacent to the outer edge of the plates and obviously serve to support the plates at proper fixed relation one to the other.

The frame of the movement is detachably supported on a bracket 20 which in turn is secured to a post 21 formed integral with and extended outward from the frame member 11, screws 22 being provided for securing the said bracket to the post. The frame of the movement is made attachable and detachable to the bracket by reason of legs 23 of the bracket being positioned in the slots 24 of the plate member 15 and by means of there being slots formed in said legs 23 to be engaged by the projections 25 of the levers 26 pivoted to the studs 27, there being two of these pivotal levers, one adjacent to each end of the bracket. This construction obviously serves for the detachable support of the clock movement on the meter frame and insures an operative connection of the indicator mechanism with the driving shaft of the meter. The rear plate 15 of the indicator movement is provided with a bracket 28 having a forked end portion to straddle the driving shaft 12 of the meter in a way to insure the proper alignment of the same with the driven gear 39 of the indicator movement when the movement is applied as in use.

The dial plate 29 may be secured to the front plate 14 by means of screws 30 and as shown includes four dials, one for each of the four pointers, each dial being provided with a series of numerals ranging from 1 to 10. The first dial located at the right as seen in Fig. 1 is to accommodate the first pointer on shaft 31 while the second dial is to accommodate the second pointer on shaft 32. The third dial accommodates the third pointer on shaft 33 and the fourth dial is read in connection with the fourth pointer on shaft 34. These pointer shafts are connected by a gear train so that the respective shafts 32, 33 and 34 are operated one-tenth of a turn with relation to a complete turn of the adjacent shaft through which it is driven as for instance, the first pointer shaft 31 includes a small gear 35 that meshes with and drives large gear 36 mounted upon the pointer shaft 32. This shaft 32 in turn includes a small gear which drives a large gear 37 upon the pointer shaft 33 while the said shaft 33 in a like manner operates the pointer shaft 34 through the gear 38. This portion of the gear train including the several dials and pointers is also of standard construction and is operated from the meter shaft through various forms of reducing mechanism which in the instance of my invention is of novel construction.

The worm 13 upon the driven shaft 12 engages and drives a large gear 39 upon an intermediate or ratio shaft 40 whose pintle ends 41 and 42 are journalled in sockets 43 and 44 respectively of the brackets 45 and 46 projected from the back plate 15. This shaft 40 is arranged on an angle, one of the bearings being positioned higher than the other, which positioning is particularly favorable to low friction. The angle upon which this shaft is placed coincides with the helix of the worm surfaces instead of being operated by the sharp edges of the teeth as ordinarily. The natural force of gravity in this arrangement tends to keep the end pressure against the lower pivot which is especially prepared to take the end thrust. This is further aided by the fact that the worm is left hand, but should a right hand worm be used the worm friction lessens the gravity friction and betters the situation.

The same argument applies to the worm shaft 47, but here the worm meshing with gear 48' on first pointer shaft comes left hand and neutralizes gravity friction.

A small gear 48 mounted upon the ratio shaft meshes with and drives a larger gear 49 on the worm shaft 47. The worm shaft includes a worm 50 that meshes with and drives the gear 35 on the shaft 31 in a way to materially reduce the ratio as between the two shafts. This worm shaft 47 is provided with pintle ends, one of which is rotatably seated in a socket 51 in the before mentioned post 18 while the other pintle end 52 is similarly journalled in a socket 53 of the before mentioned post 17. The post 18 is provided with a recessed portion 54 that is engaged by a lug 55 struck up from the plate 15 in a way to allow the post to be turned slightly by and when the screw 56 is loosened for the purpose of loosening the post to turn the same and disconnect the worm 50 from gear on the first pointer shaft 31. The upper end of this post 18 is provided with a slot 18' to form a friction that causes it to turn with the screw within the limits of the recess 54.

The post 17 in which one end of the worm shaft is located is positioned lower in the clock movement frame than its connecting post 18, thereby serving to support the worm shaft at an incline, similar to that of the ratio shaft as shown in Figs. 2 and 3, when the meter and indicator are standing in an upright position. This obviously serves to form a thrust bearing in the said post 17 insuring a lighter running movement.

Having thus described my invention, what I claim and desire to secure by Letters Patent is:

1. In a meter indicator having a series of pointer devices having intermeshing gears, a gear for operating said intermeshing gears and having a fixed axis, of an operating shaft carrying a worm meshing with and adapted to drive said gear and a manually adjustable bearing mounting said worm shaft for swinging movement about one end for temporarily disengaging said worm and gear for the purpose of permitting positioning the indicator pointer devices independent of the worm, said bearing being normally rigid.

2. In a meter indicator having a series of indicating pointer devices having intermeshing gears and a gear for operating said intermeshing gears and having a fixed axis, of an operating shaft carrying a worm meshing with and adapted to drive said gear, posts including bearings disposed radially of the axis of said posts and in which the ends of the shafts are mounted, and means for adjustably turning one of the posts about its axis to swing said worm shaft about the other post as a pivot to disengage the worm and gear, for the purpose of permitting positioning the indicating pointer devices independently of said worm.

3. In a meter indicator including a series of dials, and mechanism for rotating said dials and including a driving gear, a shaft bearing a worm for engaging said gear, and adjustable means in which the pintle ends of the shafts are mounted, adapted for moving the worm shaft transversely into and out of engagement with said driving shaft.

4. In a meter indicator including a series of dials and mechanism for rotating said dials, including a driving gear, a shaft bearing a worm for engaging said gear bearings in which the pintle ends of the shafts are mounted, and means for adjusting one of said bearings whereby one end of the worm shaft is swung about the other end as a pivot and the worm disengaged from the gear for permitting independent resetting of the dials.

5. In combination with the driving gear of a meter-indicator, a shaft carrying a worm adapted to mesh with said gear, a bearing for one end of said shaft allowing swinging movement thereof, and a bearing for the other end of the shaft adjustable about an axis, disposed at right angles to the axis of the shaft, whereby the shaft may be swung about said other bearing as a pivot to disengage said worm from said gear.

6. In combination with the driving gear of a meter-indicator, a shaft carrying a worm adapted to mesh with said gear, a bearing for one end of said shaft allowing swinging movement thereof, and rotatable bearing means for the other end having a bearing portion adjustable about an axis at right angles to the axis of the shaft, and adjustment means for operating said bearing means adapted to have primary movement in one direction to loosen said bearing means and secondary movement to turn it, and having primary movement in the other direction to turn said means and secondary movement to tighten it.

Signed at Bridgeport, in the county of Fairfield and State of Connecticut, this 27th day of July, A. D., 1921.

CHARLES S. COLE.

Witnesses:
C. M. NEWMAN,
GRACE E. NOONAN.